US006359081B1

(12) United States Patent
Shimada et al.

(10) Patent No.: US 6,359,081 B1
(45) Date of Patent: Mar. 19, 2002

(54) BLOCK COPOLYMER WITH CONDENSATION OR VINYL POLYMER, FUNCTIONS IMPARTING, AND LOWER COHESIVE E SEGMENTS

(75) Inventors: Masayuki Shimada, Sakai; Yasuyuki Agari; Yoichiro Makimura, both of Osaka, all of (JP)

(73) Assignees: Takiron Co., Ltd.; Osaka Municipal Government, both of Osaka (JP)

( * ) Notice: Subject to any disclaimer, the term of this patent is extended or adjusted under 35 U.S.C. 154(b) by 0 days.

(21) Appl. No.: 09/552,245

(22) Filed: Apr. 19, 2000

Related U.S. Application Data

(62) Division of application No. 08/983,431, filed as application No. PCT/JP97/01556 on May 9, 1997, now abandoned.

(30) Foreign Application Priority Data

May 9, 1996 (JP) .............................. 8-140645
May 24, 1996 (JP) .............................. 8-129818

(51) Int. Cl.$^7$ ..................... C08F 293/00; C08G 77/442; C08G 77/445; C08G 77/448; C08G 77/452
(52) U.S. Cl. .......................... 525/468; 525/29; 525/101; 525/280; 525/294; 525/297; 525/299; 525/318; 525/319; 525/323; 525/324; 525/426; 525/446
(58) Field of Search .................... 525/468, 29, 101, 525/280, 294, 297, 299, 318, 319, 323, 324, 426, 446

(56) References Cited

U.S. PATENT DOCUMENTS

| | | | |
|---|---|---|---|
| 3,291,859 A | 12/1966 | Tobolsky ................... | 260/859 |
| 4,980,418 A | 12/1990 | Sasaki et al. ............... | 525/132 |
| 5,039,734 A | 8/1991 | Kinoshita et al. ........... | 525/131 |
| 5,055,521 A | 10/1991 | Parsy et al. ................ | 525/182 |
| 5,124,431 A | 6/1992 | Ohta et al. .................. | 528/203 |
| 5,264,491 A | 11/1993 | Quirk ......................... | 525/177 |
| 5,268,426 A | 12/1993 | Parsy et al. ................ | 525/89 |
| 5,314,954 A | 5/1994 | Ohishi et al. ............... | 525/132 |
| 5,349,018 A | 9/1994 | Tagami et al. .............. | 525/92 |

FOREIGN PATENT DOCUMENTS

| | | |
|---|---|---|
| EP | 0 124 347 | 11/1984 |
| EP | 0 602 008 A2 | 6/1994 |
| EP | 0 691 378 A2 | 1/1996 |
| JP | 59-27908 | 2/1984 |
| JP | 61-19630 | 1/1986 |
| JP | 61-252230 | 11/1986 |
| JP | 63-57642 | 3/1988 |
| JP | 63-57643 | 3/1988 |
| JP | 5-25271 | 2/1993 |
| JP | 5-41668 | 6/1993 |
| JP | 6-279555 | 10/1994 |
| JP | 6-298880 | 10/1994 |
| JP | 7-331088 | 12/1995 |
| JP | 8-134117 | 5/1996 |
| JP | 9-104860 | 4/1997 |
| WO | 94/24112 | 10/1994 |

OTHER PUBLICATIONS

Patent Abstracts of Japan, vol. 097, No. 008, Aug. 29, 1997 & JP 09–104860 A, Apr. 22, 1997 * abstract *.
Patent Abstracts of Japan, vol. 095, No. 009, Oct. 31, 1995 & JP 07–145247 A, Jun. 6, 1995 * abstract *.

*Primary Examiner*—Robert E. L. Sellers
(74) *Attorney, Agent, or Firm*—Wenderoth, Lind & Ponack, L.L.P.

(57) ABSTRACT

A functional block copolymer useful as a compatibilizing agent for a blend of a condensation polymer and vinyl polymer comprises segments of a condensation polymer and a vinyl polymer derived from a reactive functional group-containing monomer or a functions-imparting monomer such as ultraviolet absorption or flame retardant functions. The block copolymer can further include a segment of a lower cohesive energy polymer. The condensation or vinyl polymer segment, or the lower cohesive energy polymer segment contains azo or peroxide groups which act as a polymerization initiator for the copolymerization of the vinyl monomer forming the vinyl polymer segment.

8 Claims, 5 Drawing Sheets

(A)

(B)

BLOCK COPOLYMER WITH CONDENSATION OR VINYL POLYMER, FUNCTIONS IMPARTING, AND LOWER COHESIVE E SEGMENTS

This is a divisional application of Ser. No. 08/983,431 filed Jan. 7, 1998, abandoned which is a 371 application of PCT/JP97/01556 filed May 9, 1997.

TECHNICAL FIELD

The present invention relates to a block copolymer type compatibilizing agent for a blend resin containing a vinyl-based polymer and a condensation type polymer, and a method for production thereof.

The present invention relates to a functional block copolymer for imparting functions such as a ultraviolet ray absorbing ability and flame retardant property to a synthetic resin and a method for production thereof.

PRIOR ART

In general, a synthetic resin is required to have various functions depending on the use and the using condition, and therefore, a conventional synthetic resin is modified to impart novel functions to the resin by adding functional monomers or polymers into the resin. As an example, for prevention of ultraviolet interference on a synthetic resin, a ultraviolet absorber such as a benzophenone derivative, benzotriazol derivative or the like is added to prevent ultraviolet ray-induced degradation of the synthetic resin itself and to impart weatherability to the resin.

For imparting flame retardant property, antimony oxide, phosphorus compounds or halogenated compounds is also conventionally used.

In addition to the addition of such functional monomers or polymers, there is a blend resin method as a method widely used for improvement of the properties of a synthetic resin. The blend resin method is a method of mixing two or more polymers to form a synthetic resin so as to take in excellent properties of each polymer for improvement of the characteristics of the resin. For forming the blended resin, it is important that these polymers have compatibility to each other since the forming is in general conducted after mixing and melting them. When the compatibility between the polymers is poor, the blended resin sometimes can not manifest the expected characteristics thereof and some modifiers for compatibility or compatibilizers should be added to the polymers.

Though it can also be supposed that a condensation-type polymer (for example, ester-based polymer) and a vinyl-based polymer are combined and blended, when these polymers are incompatible or partially compatible, suitable compatibilizers are required.

Regarding associated techniques, there is known a technique for copolymerization of a condensation-type polymer (for example, polyester-based polymer) and vinyl-based polymer (Japanese Patent Application Laid-Open (JP-A) No. 59(1984)-27908), and since this block copolymer itself was used as a thermoplastic resin being subjected to heat forming, the characteristics thereof were determined by the composition and properties from each polymer, and, further, it was difficult to regulate the composition at will and the copolymer resin was expensive due to the production method.

Further, there is a case in which whole resin may have the function through the resin and a case in which only the surface layer of the formed resin article may have the special function. Regarding the former case, compatibility is required for mutual solution of blended polymers or for micronization and dispersion of the polymers in the micro structure of the resin, and for this reason a compatibilizing agent is utilized in the melt-blend of incompatibilizing polymers.

As an example of the latter case, there is a surface antistatic agent which lowers the surface electrical resistance and impart electrical conductivity. Regarding this technique, Japanese Patent Application Publication (JP-B) No. 5(1993)-41668 suggests an antistatic agent comprising a block copolymer obtained by introducing a hydrophilic vinyl-based segment and a hydrophobic vinyl-based segment using a polyazo compound as a polymerization initiator, in which electrical static charge of the resin is prevented by producing surface electrical conductivity by the hydrophilic segment.

Further, in relation to the present invention, Japanese Patent Application Publication (JP-B) No. 5(1993)-41668 suggests an antistatic agent for imparting electrical conductivity to a vinyl-based synthetic resin obtained by using an azo group as a vinyl polymerization initiator and by block-polymerizing vinylmonomers in turn, to form a hydrophilic segment and hydrophobic segment in a polyazo compound.

Also, there is known a technique in which a polycarbonate copolymer which is obtained by copolymerization with a styrene-based polymer and subsequent modification is used as an optical lens, and the optical distortion thereof is improved (Japanese Patent Application Laid-Open (JP-A) No. 61(1986)-19630).

Regarding the above-mentioned ultraviolet absorbing property, the above-mentioned lower-molecular ultraviolet absorbing agent is conventionally added in a small amount (for example, from 0.02 to 0.1% (by weight)). However, even if this agent is added in a large amount in the process of forming of a synthetic resin, it is vaporized in the step of heat-melting, therefore, the yield thereof is low and the synthetic resin is unpreferably expensive.

Also, as a higher-molecular ultraviolet absorbing agent, random copolymers formed of styrene and a vinyl-based ultraviolet absorbing compound are known. Though the higher-molecular ultraviolet absorbing agent is effective for prevention of the vaporization in heat-melting, its compatibility with a resin to be added becomes a problem. For example, regarding the above-mentioned ultraviolet-absorbing polymer comprising styrene, because the polymer has poor compatibility with a polycarbonate, the homogeneous dispersion of the polymer can not be obtained, so that synthetic resins in which the polymer can be utilized are limited.

Also regarding flame retardant property, a phosphorus compound is utilized from the viewpoint of stability and transparency for a transparent synthetic resin. However, in this case, such compatibility that enables uniform dispersion in the resin is necessary.

In general, as functions to be manifested uniformly in the resin, there are flame retardant property, impact resistance, radiation resistance and the like. For manifesting these functions, it is necessary that functional components manifest compatibility to the synthetic resin after melting and are dispersed uniformly in the resin.

Further, in the point of functionalization of the surface properties and conditions of a synthetic resin, there are required ultraviolet absorbing property, pollution resistance, antibacterial property and the like in addition to antistatic property and electrical conductivity. In this case, uniform dispersion within the resin is not necessarily required, rather, it is required a nature that these function imparting components gather on the surface in a cooling process after melting in forming. Therefore, because of these functions, necessity occurs to regulate distribution of the functional components in the resin.

On the other hand, also regarding polymer components in the synthetic resin, there is a case in which not only a vinyl-based polymer but also a condensation-type polymer, particularly an aromatic ester-based polymer is required to have these functions, and further there is a case in which a specific resin is required to comprise a material endowed with these specific functions. Therefore, when a function modifying agent is used, compatibility and uniform dispersion property between the specific resin and the modifying agent become problems.

Further, as described-above, when a mixture of a polycarbonate and a styrene-based polymer is used as a optical lens, the birefringence thereof is a problem. For this use, there is used a resin having negative optical anisotropy opposite to that of a polycarbonate, for example a resin having lowered optical aeolotropy by copolymerization with a polystyrene as described above. However, if a polycarbonate and a polystyrene are not copolymerized but can be mixed in a constant ratio and the structure thereof can be micronized differing from the above-mentioned method, it is expected that optical isotropy can be provided and birefringence can be solved by such a simple means as mixing, and, a compatibilizing agent will be required here.

Further, since polycarbonate resins are excellent in translucency, strength, impact resistance, heat resistance and the like, they are used as a substrate material of a laser compact disk. A polystyrene is used for a case accommodating this disk, and the compact disk is often discarded simultaneously together with the case. And, when such discarded plastic materials are recovered and reused, the polycarbonate and polystyrene are molten simultaneously and metal parts and the like are separated from the melt before the melt is formed into some article by injection molding, extrusion or the like and the article is utilized as a blend product of polycarbonate-polystyrene. However, the compatibility between a polycarbonate and a polystyrene is poor, and the blend product thereof suffers from lowering of mechanical strength and impact strength and can not be handled in the same manner as a formed article comprising only a polycarbonate, therefore it is required to modify the blend product of polycarbonate-polystyrene.

The object of the present invention is to provide a compatibilizing agent which can enhance the compatibility between polymers in a blend resin having any blending composition at will and a method for producing the same.

Further, another object of the present invention is to provide a production method in which a component of a compatibilizing agent can be prepared from a constitutional component of a blend resin to which the compatibilizing agent is added.

Further, another object of the present invention is to provide a polymer for imparting the above-mentioned functions to a condensation-type copolymer, particularly a synthetic resin comprising an aromatic ester-based polymer and a vinyl-based polymer, and a method for producing the same, and by utilizing them, such a functional polymer and a modifier using the same are provided.

DISCLOSURE OF THE INVENTION

The present invention provides a compatibilizing agent for a resin obtained by blending a condensation-type polymer and a vinyl-based polymer. Namely, by using as a compatibilizing agent a block copolymer composed of a polymer compatible with the aforesaid condensation-type polymer and the other polymer compatible with the vinyl-based polymer, the compatibility between the condensation-type polymer and the vinyl-based polymer is enhanced in mixed condition in blending.

Namely, the compatibilizing agent of the present invention is a condensation-type vinyl-based block copolymer obtained by previously incorporating a segment of a condensation-type polymer into a polyazo compound to obtain a macroazo polymerization initiator and by polymerizing a vinyl-based monomer at the azo group site.

This block copolymer has a structure which comprises a segment of the condensation-type polymer and a segment of the vinyl-based polymer in a straight chain. Then, when the compatibilizing agent is added to a melt in polymer-blending, the block copolymer acts on the molten mixture of the condensation-type polymer and the vinyl-based polymer having poor solubility each other and the condensation-type polymer segment is dissolved in the condensation-type polymer and the vinyl-based segment is dissolved in the vinyl-based polymer, therefore, the mutual dispersing property of the condensation-type polymer phase and the vinyl-based polymer phase, namely compatibility is improved via the block copolymer, and micronization and compactness of the micro structure of the resulting resin are improved.

Further, in the present invention, there is provided a block copolymer comprising either a condensation-type polymer or vinyl-based polymer segment and a vinyl-based function imparting polymer segment in a repeating unit in the chain, and this block copolymer can be utilized as a main component or a part of components of a synthetic resin to manifest functions due to the function imparting segment in the synthetic resin.

The condensation-type or vinyl-based segment which the block copolymer has can be selected to manifest compatibility with a polymer in a resin to be added, and consequently the block copolymer is uniformly dispersed in the resin, therefore, the block copolymer can also be used as an additive for the resin.

The block copolymer of the invention is formed by block-copolymerizing a radical-polymerizable monomer for imparting functions to a polyazo compound comprising the segment of a condensation-type or vinyl-based polymer and an azo group in a repeating unit.

Further, as the other method, the block copolymer is also formed by block-copolymerizing a radical-polymerizable monomer for imparting functions to a polymeric peroxide comprising the segment of a condensation-type or vinyl-based polymer segment and a peroxide group in a repeating unit using the peroxide as a polymerization initiator.

The monomer for imparting functions becomes a function imparting segment by block-copolymerization, and the copolymer manifests functions, in the blend resin added, corresponding to the inherent natures which the monomer have. The example of such functions includes flame retardant property, heat resistance, radiation resistance, ultraviolet ray absorbing property, antistatic property, surface electrical conductivity, oxidation resistance, pollution resistance, antimicrobial property and the like.

In the block copolymer of the present invention, there is also used a segment which is obtained by polymerizing a monomer having lower cohesive energy to the third block segment together with the condensation-type or vinyl-based polymer segment and the function imparting polymer segment. This segment having lower cohesive energy is a polymer having lower cohesive energy than the condensation-type or vinyl-based polymer segment or the main constituting component polymers of the synthetic resin.

Since the segment having lower cohesive energy migrates to the surface of the block copolymer and coheres after melt-setting of the block copolymer, the function imparting segment in the chain of the block copolymer moves to the surface layer together with the migration of the segment having lower cohesive energy, and is condensed in the layer. As a result, the functions work in concentration in the resin surface layer. As functions required in such a surface layer, ultraviolet ray absorbing property, antistatic property, surface electrical conductivity, oxidation resistance, pollution resistance, antimicrobial property and the like are important.

PREFERRED EMBODIMENTS OF THE INVENTION

Figure 1:
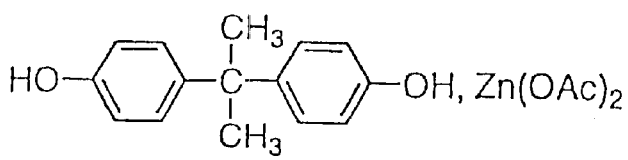
FIG. 1 shows the formation process of the polycarbonate diol by decomposition of the polycarbonate PC in the first step of the production method of the present invention.
Figure 1:
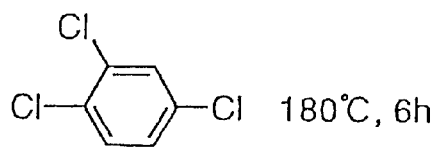
Figure 1:
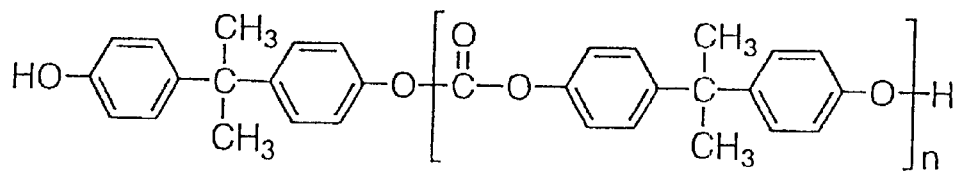

To begin with, in the block copolymer used as a compatibilizing agent, an azo compound comprising the above-mentioned condensation-type polymer segment and an azo group in a repeating unit is utilized as a polyazo compound used for forming the block copolymer, and such a polyazo compound is obtained by polycondensating an azobiscarboxylic acid chloride or azobiscarboxylic acid and an oligomer having hydroxyl groups on both ends of the chain of the above-mentioned condensation-type polymer.

In the present invention, the azobiscarboxylic acid chloride is preferably azobiscyanocarboxylic acid chloride represented by the following formula 1 (wherein, n is an integer from 1 to 3).

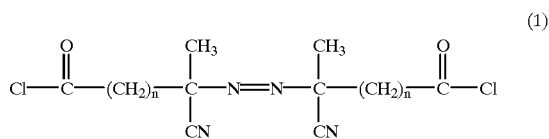

Particularly, 2,2'-azobis(2-cyanopropionic acid chloride) or 4,4'-azobis(4-cyanopentanoic acid chloride) is preferably used.

As the condensation-type oligomer having hydroxyl groups on both ends, there may be used diols of aromatic polycarbonates corresponding to the aromatic polycarbonate in the condensation-type resin, diols of polyethylene terephthalate and polybutylene terephthalate corresponding to the aromatic polyester in the condensation-type resin, and diols of polycaprolactam, polylactic acid and the like.

The block copolymer of the present invention is obtained by radical-polymerizing a vinyl-based monomer at the azo group site of the above-mentioned polyazo compound. The example of this vinyl-based monomer used includes vinyl chloride, vinylidene chloride, vinyl acetate, acrylic acid, alkyl acrylates and alkyl methacrylates such as methyl acrylate, ethyl acrylate, butyl acrylate, n-hexyl acrylate, cyclohexyl acrylate, 2-ethylhexyl acrylate, methacrylic acid, methyl methacrylate, ethyl methacrylate, butyl methacrylate, n-hexyl methacrylate, cyclohexyl methacrylate, 2-ethylhexyl methacrylate and the like, aromatic vinyls such as styrene, α-methylstyrene, dimethylstyrene, chlorostyrene, bromostyrene, vinyltoluene and the like, acrylonitrile, methacrylonitrile, acrylamide, methacrylamide and the like, and also olefins such as ethylene, propylene, butene and the like and dienes such as butadiene, isoprene and the like.

Further, the above-mentioned vinyl-based monomers may also be used in combination of more than one of them, and in this case, carboxylic acids such as acrylic acid and methacrylic acid may also be contained.

Further, in addition to the vinyl-based monomers, such a vinyl-based oligomer as having a vinyl group on the end of the above-mentioned polymer from vinyl-based monomers can also be used. For example, oligomers such as acrylate, acrylonitrile, butadiene, styrene and the like in which a vinyl group is formed on the end and the end is terminated can be used.

The copolymers obtained by block-copolymerization of these polyazo compounds and the above-mentioned vinyl compounds have a structure comprising a condensation-type polymer segment and a vinyl-based polymer segment and a (cyano)carboxylic acid residue between them in a repeating unit of the chain.

It is also possible that a condensation-type polymer and a vinyl-based polymer which are a segment of a copolymer may be selected to be identical with the constituting polymer components of the blend. By this fact, compatibility of the copolymer with the blend is improved. However, as a polymer of each segment, any polymer having compatibility with each polymer constituting the resin can also be selected, and the polymer of the blend and the polymer of the compatibilizing copolymer segment are not necessarily restricted to the same polymer.

The production method of such block copolymers is as follows. Namely, in the first step, a condensation-type oligomer having hydroxyl groups on both ends is formed by cutting the chain of the condensation type polymer as a starting material by the divalent alcohol of the aforesaid polymer forming component in the presence of a catalyst.

In the second step, this condensation-type oligomer having hydroxyl groups on both ends and a carboxylic acid chloride containing an azo group is poly-condensated to form a polyazo compound.

In the third step, a vinyl monomer is block-polymerized to the aforesaid polyazo compound using the aforesaid azo group as a initiating agent to form a block copolymer. This resulted block copolymer is used as a compatibilizing agent.

The first step has a merit that a condensation-type oligomer having hydroxyl groups on both ends can be formed using a commercially available condensation-type polymer as a starting material.

As the above-mentioned divalent alcohol as a polymer forming component, bisphenol A may be used when a polycarbonate is a starting material in the first step. FIG. 1 shows an example of the first step in which a polycarbonate (PC) is used as a raw material, wherein a polycarbonate (PC), bisphenol A which is a starting material monomer of a polycarbonate and a catalyst zinc acetate are added in trichlorobenzene, and are heated and dissolved to cut the chain of the polycarbonate and subsequently the cooled mixture is poured into a great amount of methanol for sedimentation. In this process, in the sedimentation, a carbonate oligomer is formed having phenolic hydroxyl groups on both ends.

When the starting material polymer is polyethylene terephthalate or polybutylene terephthalate, as the above-mentioned divalent alcohol which is a polymer forming component, ethylene glycol or 1,4-butane diol may be used respectively, and in the same reaction, the oligomer of ethylene terephthalate or butylene terephthalate is formed in which the each end thereof is hindered by a hydroxyethyl group or hydroxybutyl group.

Figure 2:
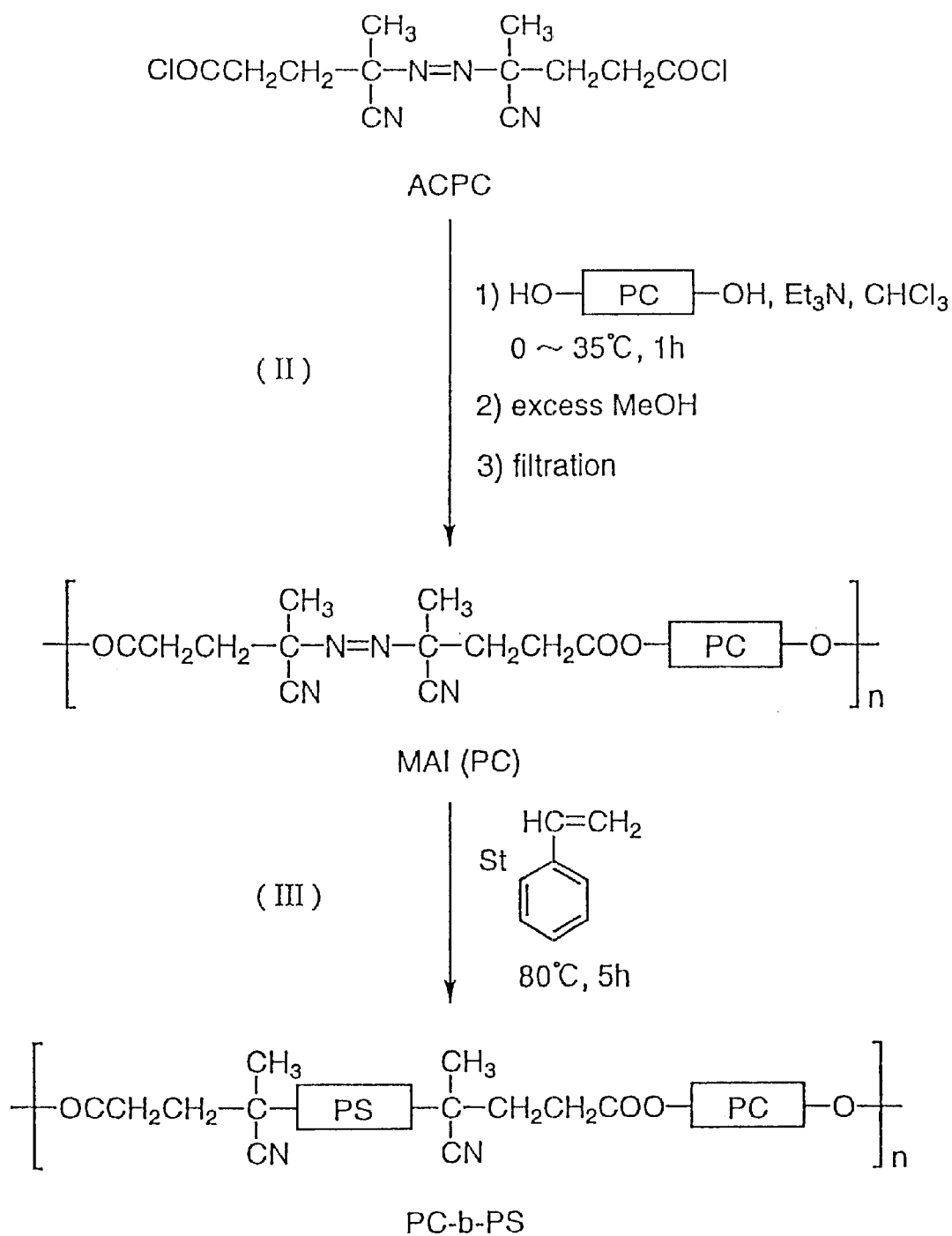
FIG. 2 shows the formation process of the polyazo compound in the second step of the production method of the present invention and the formation process of the polycarbonate-polystyrene copolymer in the third step.

In the second step, as an example of a polycarbonate (PC), as shown in step (II) in FIG. 2, the carbonate oligomer having hydroxyl groups on both ends and azobiscyanopentanoic acid chloride (ACPC) are subjected to a condensation reaction in a solution for polymerization. Then, sedimentation is made by pouring of the mixture into much excess methanol and the like and the sedimentation can be separated by filtration. A polyazo compound in which an azo group and a polycarbonate segment are inserted by turn is formed as a solid component.

In like manner, in the case of polyethylene terephthalate, a polyazo compound in which an azo group and a polyethylene terephthalate segment are inserted by turn is formed.

In the third step, as shown in step (III) in FIG. 2, a polyazo compound containing a polycarbonate (PC) segment and the above-mentioned vinyl-based monomer, in this example, styrene monomer (ST) are mixed and reacted utilizing the azo group itself as a polymerization initiator to form a copolymer.

In like manner, in the case of polyethylene terephthalate, a block copolymer is formed comprising a polyethylene terephthalate segment and a vinyl-based polymer segment by the polymerization reaction of a polyazo compound containing the polyethylene terephthalate segment and the above-mentioned vinyl-based monomer.

As this polymerization method, any conventional method such as a solution polymerization method, suspension polymerization method, emulsion polymerization method, mass polymerization method or the like may be used. In polymerization, the mixture may be generally heated at a temperature in the range of about 40 to 90° C. and reacted until the azo group is completely consumed. The final composition of a polycarbonate or polyethylene terephthalate and a vinyl-based polymer such as polystyrene or the like in the resulting copolymer is controlled by the content of a polycarbonate segment or the like previously contained in the polyazo compound, the amount distributed of the azo group and the amount blended of the vinyl-based monomer added, and the amount of a solvent, reaction temperature and reaction time.

Thus formed block copolymer is added as a compatibilizing agent in blending polymers respectively corresponding to two kinds of segments, and the amount added thereof is small, for example, suitably from about 1 to 10% by weight. In the case of the above-mentioned copolymer comprising a polycarbonate and polystyrene, the copolymer can be most preferably applied to a blend comprising a polycarbonate and polystyrene. However, it is needless to say that the block copolymer of the present invention can be sufficiently used for a blend having an effect as a compatibilizing agent.

Further, in the above-mentioned third step, there is also adopted a method in which a radical polymerizing monomer having a reactive functional group such as an amine, alcohol, epoxy, carboxylic acid, carboxylate, salt of carboxylic acid, cyclic acid anhydride, oxazoline, carbodiimide, isocyanate or the like may be polymerized to the above-mentioned polyazo compound together with the above-mentioned vinyl-based monomer, to form a block copolymer.

The example of the amines includes N,N-dimethylaminoethyl methacrylate, N,N-dimethylaminopropyl methacrylamide and the like.

The example of the epoxy compound includes glycidyl acrylate and the like, and the example of the esters includes methyl acrylate, vinylacetate and the like.

The example of the carboxylic acid includes acrylic acid and methacrylic acid, the example of the cyclic acid anhydride includes maleic anhydride and the like, and the example of the alcohols includes 2-hydroxyethyl methacrylate and the like.

In the method for containing this radical polymerizing monomer in the copolymer, the vinyl-based segment of the copolymer is a random polymer of a vinyl-based monomer and the above-mentioned radical polymerizing monomer, and into the copolymer is introduced a reactive functional group from the radical polymerizing monomer.

When the copolymer is added as a compatibilizing agent to a molten blend, since the reactive functional group reacts with and bonds to a phenyl group or a reactive functional group such as an amine, carboxylate, hydroxyl group or the like which the polymer in the blend system has, the compatibility between the compatibilizing agent polymer and the blend is further improved.

In particular, when the blend is composed of the combination of an aromatic polycarbonate and polystyrene, if maleic anhydride is contained in a compatibilizing agent, maleic anhydride bonds to the phenyl group in both polymers to improve the both polymers to be well soluble.

In the present invention, a polymeric peroxide compound may be also used as a vinyl polymerization initiator instead of the above-mentioned polyazo polymerization initiator. In this case, the segment of a condensation-type polymer and a dioxy group are included in the straight chain thereof, and the dioxy group works as a polymerization initiation point to radical-polymerizing the vinyl-based monomer. In this way, the polymeric peroxide can be applied as a vinyl polymerization initiator like the polyazo compound, and as a result, a compatibilizing agent composed of a block copolymer having the segment of a condensation-type polymer and the segment of a vinyl-based polymer can be formed.

On the other hand, the example of the condensation-type polymer having a hydroxyl group on each end includes diols of an aromatic polycarbonates, diols of an aromatic polyesters, for example, diols of polyethylene terephthalate, polybutylene terephthalate or polydimethylenecyclohexane terephthalate, and further, a diol of polyarylate and a diol of polylactic acid can be used, and diols obtained by ring-open polymerization of caprolactons are also used. Further, a diol of a copolymer comprising two or more of these diols is suitably used.

Such a condensation-type polymer may be selected from condensation-type polymers showing compatibility with the blend to be added in the form of the diol thereof in the case of the use of this block copolymer as an additive.

The diol of a condensation-type polymer is obtained as an oligomer having a hydroxyl group on each end by cutting the chain of the condensation-type polymer as a starting material by a divalent alcohol in the presence of a catalyst as described above. As this divalent alcohol, a divalent alcohol as a polymer forming component is usually used. In the example in which the condensation-type polymer is a polycarbonate, a polycarbonate and bisphenol A as a divalent alcohol are heated and dissolved in trichlorobenzene using zinc acetate as a catalyst and then are cooled to form a carbonate oligomer having phenolic hydroxyl groups on both ends. When the condensation-type polymer is polyethylene terephthalate, polybutylene terephthalate or polydimethylenecyclohexane terephthalate, ethylene glycol or 1,4-butane diol or 1,4-cyclohexane dimethanol is used as the divalent alcohol. Further, in the case of the above-mentioned copolymer components, the above-mentioned divalent alcohols which are used when these copolymer forming components are obtained respectively as oligomers are appropriately preferably used.

Further, as the vinyl-based polymer having a hydroxyl group on each end, the diol of a polyacrylate or a polyolefin may be utilized, and, for example, diols of polyethylene, polypropylene and polybutylene may be listed.

The use of a polyazo compound having a polyolefin segment has a merit that the compatibility with the polyolefin-based resin of the block copolymer formed is enhanced, and is effective for imparting functions to the polyolefin-based resin.

In particular, as the polyolefin having hydroxyl groups on both ends, there may be used a polyolefin polyol with reactive OH groups on the both ends, as reprsented by the formula 2, and is available as "Polytail H" or "Polytail HA" manufactured by Mitsubishi Chemical Co., Ltd. The use of "Polytail H" and "Polytail HA" is suitable for the use of a block copolymer as a function imparting additive to a polyethylene resin and polypropylene resin.

(2)

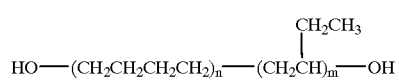

The polyazo compound is obtained by condensating the above-mentioned azobiscarboxylic acid chloride to the olefin oligomer or condensation type oligomer having hydroxyl groups on both ends in a solution for polymerization and by sedimentation and separation by pouring of the resulting polymer into much excess methanol and the like. In the example using the carbonate oligomer having a hydroxyl group on each end, a polyazo compound into which a polycarbonate segment and an azo group are inserted by turn is obtained.

Thus formed polyazo compound contains the segment of a condensation-type polymer or a vinyl-base polymer and an azo group in a repeating unit, and is used as a macroazo polymerization initiator-in polymerization with the other function imparting vinyl-based monomer.

The example of the function imparting vinyl-based monomers includes ultraviolet ray absorbing compounds each having a vinyl group, for example, (meth)acrylate esters of benzotriazole derivatives-or benzophenone derivatives, and by using these monomers, ultraviolet ray absorbing function can be imparted to the copolymer.

As one example, 2-hydroxy-4-(2-methacryloyloxyethoxy) benzophenone represented by the formula 3 can be used.

(3)

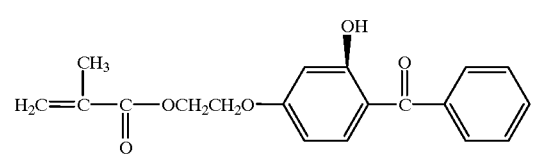

Also, as the function imparting vinyl-based monomer, an organic phosphate monomer having a vinyl group is used to impart flame retardant property to the copolymer. The example of such a flame retardancy imparting monomer includes diethyl(vinylphenyl)phosphate, diethyl 4-vinylbenzenephosphinate and the like.

Figure 4:
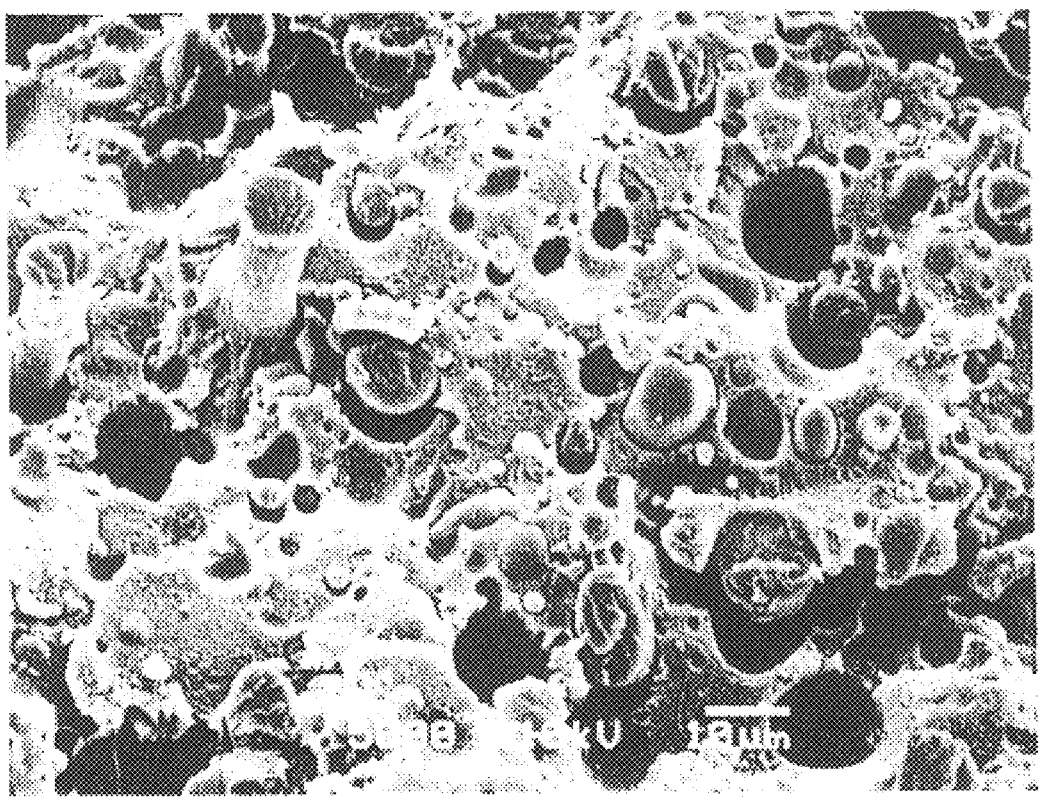
FIG. 4 shows a scanning electron microscope photograph similar to FIG. 3 of the impact test piece formed from the blend of polycarbonate-polystyrene. This blend is one to which a commercial modifier is added and belongs to comparative examples.

As the other example, diphenyl-2-methacryloyloxyethylphosphate (available as "MR-260" manufactured by Daihachi Kagaku Kogyo K. K.) as shown in FIG. 4 is preferably used.

(4)

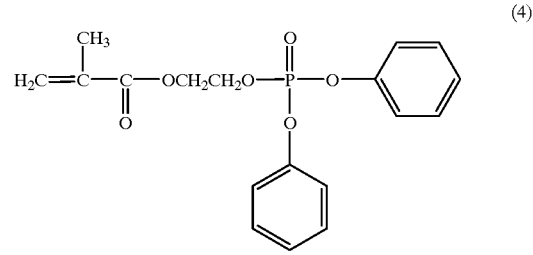

Further, as the pollution resistance imparting vinyl-based monomer, there are used monomers or oligomers having lower cohesive energy. They are evaluated in terms of a solubility parameter $\delta[cal/cm^3]^{1/2}$ or critical surface tension $\gamma_c$ dyn/cm, and there is used one which has lower cohesive energy as compared with the above-mentioned vinyl-based polymer and condensation-type polymer constituting the copolymer segment, and, in particular, the monomer of an organic siloxane or fluoroalkyl having a vinyl group on the end can be used.

The monomer of an organic siloxane or fluoroalkyl becomes a segment having lower cohesive property by copolymerization, which migrates to the surface layer of the copolymer and obtains hydrophobicity and surface lubricating and non-adhesive property, to prevent adhesion of stains on the surface of the copolymer. When the block copolymer formed in this way is added to the other resin, pollution resistance is imparted to the surface of the resin.

Further, heat resistance can be increased by using a N-substituted maleimide compound as the vinyl-based monomer. As the N-substituted maleimide, N-methylmaleimide, N-butylmaleimide, N-cyclohexylmaleimide, N-phenylmaleimide and the like may be used.

As the other examples, the monomers of an antioxidation compound, pollution resistant compound, antimicrobial compound and surface electrical conductive compound which have a vinyl group and can be radical-polymerized can be introduced. By using these monomers, corresponding functions can be imparted to the block copolymer.

Regarding the production method of the block copolymer, the operation to polymerize a polyazo compound and the above-mentioned functional vinyl-based monomer is conducted by a conventional polymerization method such as a mass polymerization method, solution polymerization method, suspension polymerization method, emulsion polymerization method and the like at a reaction temperature in the range of 60 to 140° C. until the azo group in the polyazo compound is completely consumed.

The block copolymer is also polymerized with a vinyl-based monomer for imparting compatibility together with a vinyl-based monomer for imparting the other functions to improve the compatibility of this block copolymer itself with a resin to be added.

The example of the vinyl-based monomer for imparting compatibility includes a vinyl chloride, vinylidene chloride, vinyl acetate, acrylic acid, methyl acrylate, ethyl acrylate, propyl acrylate,butyl acrylate, 2-hydroxyethyl acrylate, 2-hydroxypropyl acrylate, 2-ethylhexyl acrylate, glycidyl acrylate, benzyl acrylate, phenoxyethyl acrylate, tetrahydrofurfuryl acrylate, methacrylic acid, methyl methacrylate, ethyl methacrylate, propyl methacrylate, butyl methacrylate, 2-hydroxyethyl methacrylate, 2-hydroxypropyl methacrylate, 2-ethylhexyl methacrylate, glycidyl methacrylate, benzyl methacrylate, phenoxyethyl methacrylate, tetrahydrofurfuryl methacrylate and the like, and they can be adopted alone or in combination of more than one of them. Among these vinyl-based monomers, those having higher compatibility with the resin to which this copolymer is to be added are preferably selected.

For introducing the compatibility imparting vinyl-based segment into the block copolymer, the above-mentioned functional vinyl-based monomer and the vinyl-based monomer for imparting compatibility are block-copolymerized in turn to the above-mentioned polyazo compound. In this polymerization method, either one of the above-mentioned functional vinyl-based monomer or the vinyl-based monomer for imparting compatibility is polymerized to the above-mentioned polyazo compound using an azo group as an initiator, and the polymerization is terminated in the condition that the azo group remains in the produced copolymer. Then, the other vinyl-based monomer is polymerized to the produced copolymer for a long time until the aforesaid azo group is consumed. In this two-step operation, a ter-block copolymer of condensation-type segment-function imparting vinyl-based segment-compatibilizing vinyl-based segment can be formed.

The block copolymer may be further polymerized with a vinyl-based polymer having lower cohesive energy for improving surface migration property of the block copolymer relative to a resin to be added, together with the vinyl-based monomer for imparting other functions. As the polymer having lower cohesive energy like that, there are poly organic siloxanes having a vinyl group on the end or polyfluoroalkyls, and the compounds which can be used as the above-described pollution resistant vinyl-based monomer may be used without any treatment.

The poly organic siloxanes are represented by the general formula 5, and the specific example thereof includes oligomers obtained by substituting the end of polydimethylsiloxane, polydiethylsiloxane or polydiphenylsiloxane with a vinyl group.

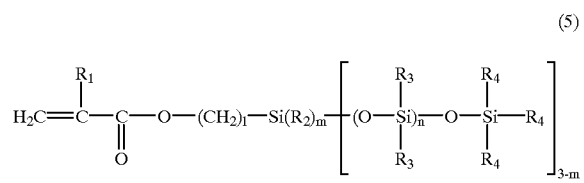

(5)

In the formula 5, $R_1$ to $R_4$ indicate a hydrogen atom, a lower alkyl group having 1 to 6 carbon atoms, a halogenated alkyl group or an aryl group. $R_1$ to $R_4$ may be the same or different. The mark l indicates an integer from 1 to 10, m indicates any number of 0, 1 or 2, n indicates 6 or an integer from 1 to 100, respectively.

Further, as the polyfluoroalkyl monomer, (meth)acrylic acid polyfluoro alkyls can be used, and the example thereof which can be used includes 2,2,2-trifluoromethyl acrylate, 2,2,2-trifluoroethyl methacrylate, 1H, 1H, 2H, 2H-heptadecafluorodecyl acrylate and the like.

The monomer of the poly organic siloxane or the polyfluoroalkyl becomes a segment having lower cohesive energy by copolymerization and this segment easily migrates to the surface of the resin, therefore, the vinyl-based segment for imparting functions also can migrates to the surface layer of the resin and is condensed in the layer, to concentrate the functions on the surface portion. The vinyl-based polymer having lower cohesive energy like this has generally lower compatibility with a usual vinyl-based or ester-based polymer constituting the resin and has hydrophobicity and easily migrates to the surface, and as a result is condensed in the surface portion of the resin, since the vinyl-based polymer having lower cohesive energy has lower cohesive energy density as compared with the other vinyl-based resin.

The segment having lower cohesive energy may be preferably used for utilizing this property when a copolymer having ultraviolet absorbing property is to be formed, as a result, increase ultraviolet absorbing property in the surface layer, and particularly, can improve effectively the surface layer degradation by ultraviolet ray. Namely, in the case that a ultraviolet absorbing component is uniformly dispersed in the resin, a superficial surface layer portion is apt to receive ultraviolet degradation, however, in the present invention, this degradation can be prevented by condensing the ultraviolet absorbing component in the surface layer.

Further, surface lubricating and non-adhesive property can be obtained as described above, the present invention also can contribute to pollution resistance of the surface of the copolymer.

For introducing the above-mentioned vinyl-based monomer having lower cohesive energy into the block copolymer, the above-mentioned functional vinyl-based monomer and the vinyl-based monomer having lower cohesive energy are block-copolymerized in turn to the above-mentioned polyazo compound. In this polymerization method, either one of the above-mentioned functional vinyl-based monomer or the vinyl-based monomer for imparting compatibility is polymerized to the above-mentioned polyazo compound using an azo group as an initiator, and the polymerization is terminated in the condition that the azo group remains in the produced copolymer. Then, the other vinyl-based monomer is polymerized to the produced copolymer for a long time until the aforesaid azo group is consumed. In this two-step operation, a ter-block copolymer of condensation-type segment-function imparting vinyl-based segment-lower cohesive energy segment can be formed.

As the other method for introducing the above-mentioned vinyl-based monomer having lower cohesive energy, it is also possible that the vinyl-based segment having lower cohesive energy is previously introduced into a polyazo compound instead of the above-mentioned condensation-type segment, and that the above-mentioned vinyl-based monomer for imparting functions is polymerized to this polyazo compound utilizing the azo group as a polymerization initiator to provide a block copolymer. In this procedure, a compatible segment is introduced by polymerizing the vinyl-based monomer before and after polymerization of the vinyl-based monomer for imparting functions.

Namely, the compatible vinyl-based monomer and the function imparting monomer which can be radical-polymerized are block-copolymerized in turn to the polyazo compound comprising the segment of the lower cohesive energy polymer and the azo group in a repeating unit using the azo group as a radical polymerization initiator.

The polyazo compound like that can be obtained by polycondensation of the above-mentioned azobiscyanocarboxylic acid chloride and the diol or diamine of a poly organic siloxane or polyfluoroalkyl. As the polyazo compound like that, the examples in which the poly organic siloxane segment is introduced are shown by the formula 6 and the formula 7, and the example in which the polyfluoroalkyl segment is introduced is shown by the formula 8, respectively.

In the copolymer of the present invention, a polymeric peroxide is also used instead of the above-mentioned polyazo compound, and the general formula of usable polymeric peroxide is shown in the formula 9. In this case, the polymeric peroxide has the above-mentioned segment of the condensation-type or vinyl-based polymer and a peroxide group, and the above-mentioned vinyl-based monomer imparting functions is block-copolymerized utilizing the peroxide group as a polymerization initiator. The copolymer to which the vinyl-based monomer imparting functions is copolymerized is produced in the same manner as the above-mentioned block copolymer using the polyazo compound.

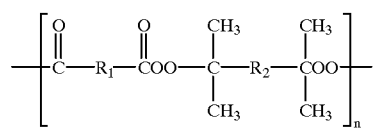

(9)

In the formulae, $R_1$ indicates a condensation-type polymer segment such as an aromatic polycarbonate, aromatic polyester, polyallylate or the like or a vinyl-based polymer segment such as a polyolefin or the like, $R_2$ indicates and ethylene group or acetylene group and n is an integer from 3 to 50.

The functional block copolymer of the present invention formed as described above can be formed to a resin article and used as it is. Further, this functional block copolymer may also be added in the other synthetic resin to impart functions to the resulting resin formed article. Particularly, the functional block copolymer of the present invention is suitable for blending functional components uniformly and homogeneously in a condensation-type or vinyl-based resin, since the functional block copolymer can be expected to manifest excellent compatibility with a resins containing as a main component a condensation-type or vinyl-based polymer which is the segment of the functional block copolymer. This is applied to a block copolymer imparting functions such as heat resistance, impact resistance, flame retardancy and the like.

(6)

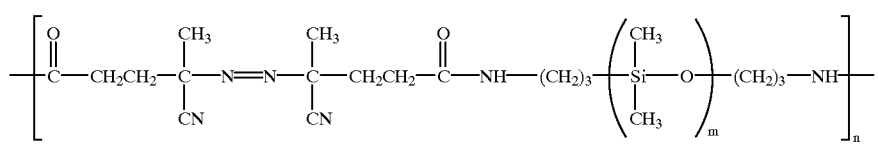

(7)

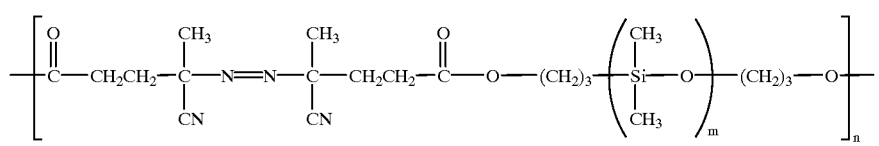

(8)

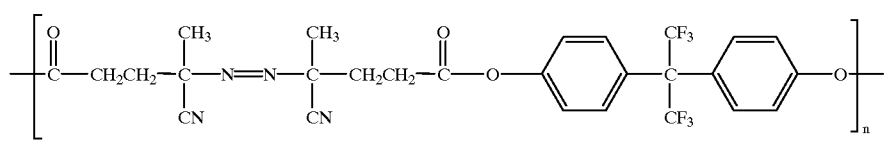

On the other hand, if functions are to be manifested on the surface portion, for example, when functions such as ultraviolet absorbing property, surface pollution resistance and the like are going to be imparted, there is a method in which a copolymer containing the segment of a lower cohesive energy polymer is added and blended to a resin for forming or molding, as described above.

Apart from this, there is a method in which this block copolymer is made into a thin layer and the layer is laminated on the surface of a molded resin, in this case, there are a method in which a film formed from the block copolymer is adhered or heat-pressed to the surface of a resin to form a resin molded article, a method in which a paint containing the block copolymer is coated on a film and this film is pressed or laminated on the surface of a resin, a method in which this block copolymer is dissolved in a solvent and the solution is blown and coated on the surface of a resin and the coated solution is dried and cured to form a film layer, a method in which a paint containing this block copolymer is coated on the surface of a resin and cured, and the like. In any method, the block copolymer is made to film form and used, therefore, each method has merits that the cost is low and it can also be applied to a resin having low compatibility.

EXAMPLE 1

There is shown an example in which a bisphenol A type polycarbonate (hereinafter, abbreviated as PC) was used as a condensation-type polymer and a polystyrene (PS) was used as a vinyl-based polymer.

(1) Production of both end hydroxyl group-carrying polycarbonate

Commercially available polycarbonate PC ("E-2000F" powder manufactured by Mitsubishi Gas Chemical Co., Inc.)(40.32 g; 2.0 mmol), 2.28 g (10 mmol) of bisphenol A and 0.21 g (1.0 mmol) of zinc acetate were suspended in 200 ml of 1,2,4-trichlorobenzene, and the mixture was heated with stirring at 180° C. for 3 hours. After cooling, the resulting mixture was charged into much excess of methanol and subjected to sedimentation and filtration to obtain 34.1 g of the intended material.

Further, there were conducted tests at 5 levels of bisphenol A equivalent amount of 1.5 to 10 per one mole of PC by changing the amount added of bisphenol A at the same conditions. The yield of the resulted both end hydroxyl group-carrying polycarbonate was calculated, and number-average molecular weight Mn and weight-average molecular weight Mw were measured by gel permeation chromatography (GPC). The results are shown in Table 1.

TABLE 1

| Sample | Equivalent amount of bisphenol A | Yield (%) | Molecular weight | |
|---|---|---|---|---|
| | | | Mn | Mw |
| lupilon E-2000F | — | — | 20320 | 30320 |
| PC-diol 1 | 1.5 | 95 | 6430 | 8900 |
| PC-diol 2 | 2.0 | 99 | 5470 | 7110 |
| PC-diol 3 | 2.5 | 95 | 4220 | 5880 |
| PC-diol 4 | 5.0 | 84 | 3310 | 4140 |
| PC-diol 5 | 10.0 | 86 | 2170 | 2730 |

It is apparent from this table that the molecular weight of the both end hydroxyl group-carrying polycarbonate is lowered when the equivalent amount of bisphenol A increases. This technique has a merit that the size of the both end hydroxyl group-carrying polycarbonate can be decreased to about 1/3 to 1/10 of the original molecular weight of PC.

(2) Synthesis of PC-containing polyazo compound

Then, 33.10 g. (10.0 mmol) of a both end hydroxyl group polycarbonate which is the sample (sample of "PC-diol 4" in Table 1) prepared by decomposing PC at the equivalent amount of a bisphenol A of 5 and 2.02 g (20 mmol) of triethylamine were dissolved in 50 ml of chloroform, and to this solution was added a solution obtained by dissolving 3.17 g (10 mmol) of 4,4-azobis(4-cyanopentanoic acid chloride) in 50 ml of chloroform dropwise with ice-cooling, then the resulting mixture was heated at 35° C. for 1 hour, subsequently was charged into much excess of methanol and was separated by sedimentation to obtain a PC-containing azo compound. The yield (amount) was 30.9 g, the yield (ratio) was 87%, the number-average molecular weight Mn was 19500, and the weight-average molecular weight Mw was 47700 by GPC. As a result of calculation, the average repeating number n in one molecule of the polyazo compound was about 5.

(3) Polycarbonate (PC)-polystyrene (PS) block copolymer

Then, 24.88 g (7.0 mmol) of the above-mentioned PC-containing azo compound and 121.4 g (1.20 mol) of styrene monomer were dissolved in to 200 ml of chloroform, and the mixture was heated and kept at 80° C. for 5 hours. After cooling, the mixture was charged into much excess of methanol and the polymer was recovered. The yield (amount) was 57.2 g, the yield (ratio) was 39%, the number-average molecular weight Mn was 27700, and the weight-average molecular weight Mw was 62100 by GPC.

The amount ration of the polycarbonate (PC) to the polystyrene (PS) in the copolymer was 37% to 63% as a result of $^1$H-NMR analysis.

(4) The addition of the block copolymer as a compatibilizing agent and injection forming A polycarbonate PC and a polystyrene PS were selected at several blend ratios for blends, to 100 parts by weight of each resulted resin was added the above-mentioned block copolymer in 5 parts amount, and the effect on the resulted resin was examined.

For comparison, there were selected a blend resin which comprises no compatibilizing agent added and a blend resin comprising a commercially available modifying agent (trade name "Bennet GR-10", EVA-EPDM-LLDPE-based reactive-type graft polymer available from Teikoku Kagaku Sangyo K. K.) in the same amount.

The mixture of PC, PS and a desired compatibilizing agent was melt-mixed at a mixing temperature of 270° C. for 5 minutes by a screw-type mixing machine under nitrogen atmosphere before the mixture was stirred with heating at a forming temperature of 280° C. and injected by a small injection forming machine to obtain a blend product.

(5) Test results

Samples were cut from this injection molded article, and subjected to the following mechanical tests.

First, a tensile strength test was conducted to make reference to JIS K7113. The results are shown in Table 2 from which it is known that when the ratio of amounts of PS to PC in the resin sample increases, the tensile strength decreases when no compatibilizing agent is added while the tensile strength does not decrease if PS is increased to about 50% as a result of the addition of a compatibilizing agent in an amount of 5 parts by weight.

TABLE 2

| Composition PC/PS | Tensile strength (MPa) | | |
|---|---|---|---|
| | No compatibilizing agent | Using compatibilizing agent | Commercially available modifier |
| 100/0 | 61.8 | 62.7 | 54.6 |
| 70/30 | 56.8 | 63.6 | 53.4 |
| 50/50 | 42.2 | 65.2 | 38.0 |
| 30/70 | 41.7 | 34.2 | 35.8 |
| 0/100 | 25.7 | 28.8 | 21.5 |

Amount blended of compatibilizing agent: 5 parts

A bending strength test was conducted to make reference to JIS K7116. The results are shown in Table 3 from which it is known that when the ratio of PS increases, the bending strength decreases when no compatibilizing agent is added while decrease in the bending strength is relatively small as a result of the addition of a compatibilizing agent in an amount of 5 parts by weight, and even if PS is added till an amount of 50%, excellent tensile strength is maintained.

TABLE 3

| Composition PC/PS | Beding strength (MPa) | | |
|---|---|---|---|
| | No compatibilizing agent | Using compatibilizing agent | Commercially available modifier |
| 100/0 | 106.7 | 111.9 | 87.2 |
| 70/30 | 98.6 | 106.6 | 80.8 |
| 50/50 | 56.4 | 68.9 | 63.5 |
| 30/70 | 53.0 | 48.7 | 43.8 |
| 0/100 | 41.3 | 37.5 | 29.6 |

Amount blended of compatibilizing agent: 5 parts

Regarding impact strength, the results of an Izod impact strength test conducted to make reference to JIS K7110 are shown in Table 4 from which it is known that PC is originally excellent in impact resistance, and with increase of PS, the impact strength steeply decreases, however, by the addition of a compatibilizing agent in an amount of 5 parts by weight, the decrease in impact resistance is lowered, and particularly, even when PC is increased by about 50%, excellent impact resistance is obtained.

TABLE 4

| Composition PC/PS | Izod impact strength (kJ/m$^2$) | | |
|---|---|---|---|
| | No compatibilizing agent | Using compatibilizing agent | Commercially available modifier |
| 100/0 | 71.6 | 79.0 | 136.0 |
| 70/30 | 37.3 | 43.8 | 33.2 |
| 50/50 | 11.4 | 45.6 | 14.3 |
| 30/70 | 8.2 | 7.7 | 9.1 |
| 0/100 | 7.3 | 5.0 | 4.5 |

Amount blended of compatibilizing agent: 5 parts

Regarding Vicat softening temperature, the results of Vicat softening temperature test conducted to make reference to JIS K7206 are shown in Table 5 from which it is known that the addition of a compatibilizing agent has almost no influence at each PC/PS blending ratio.

TABLE 5

| Composition PC/PS | Vicat softening temperature (° C.) | | |
|---|---|---|---|
| | No compatibilizing agent | Using compatibilizing agent | Commercially available modifier |
| 100/0 | 155 | 155 | 155 |
| 70/30 | 151 | 149 | 146 |
| 50/50 | 118 | 119 | 113 |
| 30/70 | 111 | 110 | 106 |
| 0/100 | 108 | 108 | 103 |

Figure 3:
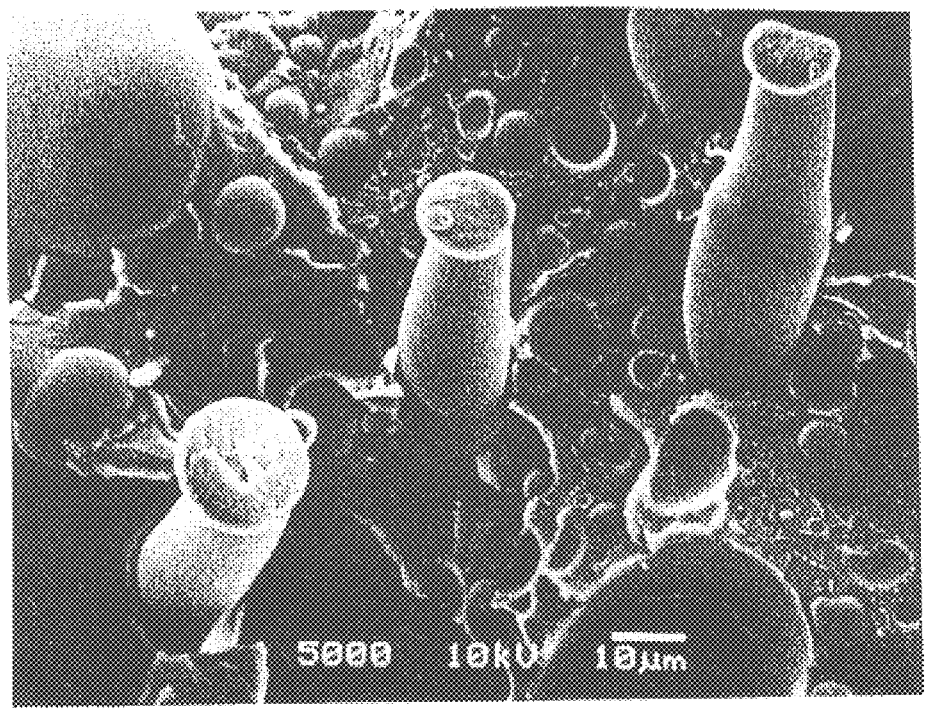
FIG. 3 shows scanning electron microscope photographs of the particle structure of the broken surface after an impact tests regarding the impact test pieces of the blend of polycarbonate-polystyrene, and (A) indicates a test piece (comparative example) to which no compatibilizing agent is added and (B) indicates a test piece (example) to which the compatibilizing agent of the block copolymer of the present invention is added.
Figure 3:
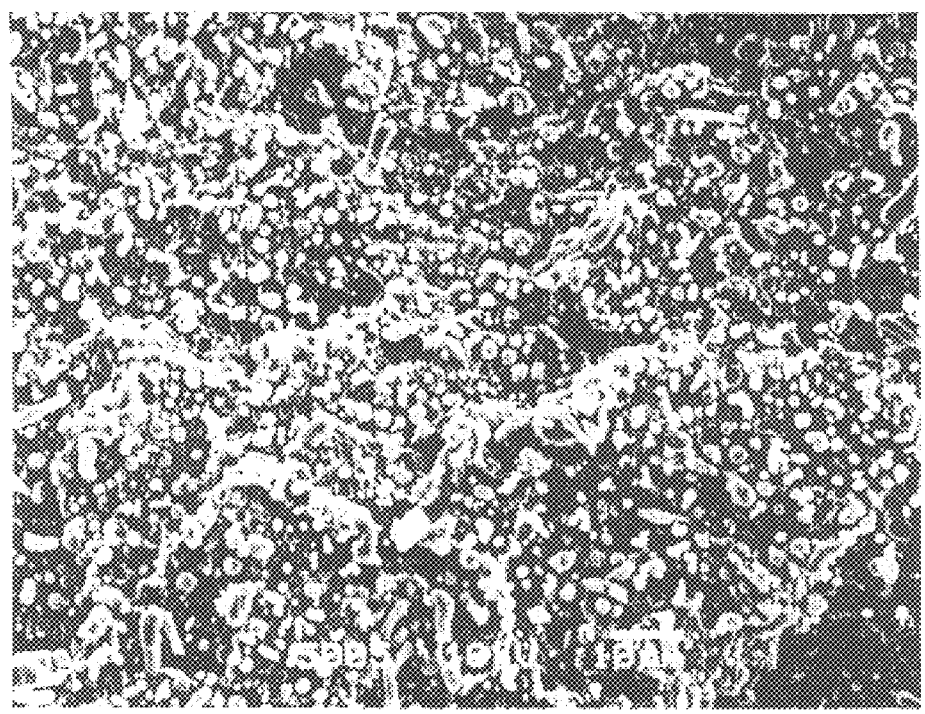

Amount blended of compatibilizing agent: 5 parts (6) Observation of structure by an electron microscope A scanning electron microscope was used to observe the broken surface of a test piece after impact tests of injection-molded articles of examples and comparative examples at a PC-PS blending ratio of 50/50 obtained in the above-mentioned process (4). FIG. 3 (A) is a scanning electron microscope photograph of a PC-PS blend article containing no compatibilizing agent added, in which a particle structure composed of PC extruding in the form of a rod or pillar is observed in the matrix of PS. In the scanning electron microscope photograph of the example in FIG. 3 (B), the particle size of PC in the matrix becomes very small, therefore, micronization of a micro structure is apparent, and the effect of compatibilization of the block copolymer is recognized.

The FIG. 4 is an electron microscope photograph in the same conditions as the sample of a comparative example using a commercially available modifier, and in the sample to which a commercially available modifier is added of the comparative example has the same structure as in the case of no addition, and a particle structure slightly in the form of a rod is observed and the distribution thereof is small, however, the effect as a compatibilizing agent is not sufficient.

A compatibilizing agent which can be used for a PC-PS blend resin is shown in this example. The PC-PS blend resin like that, in particular, can possess extreme fine structure, and as a result has optical isotropy and does not cause birefringence phenomenon, therefore the blend resin is suitable for use as a optical thin plate and film material such as a photomemory medium, photo display and the like.

EXAMPLE 2

(1) Polycarbonate (PC) segment -containing polyazo compound

In this step, 20.3 g of a polycarbonate ("E-2000F" manufactured by Mitsubishi Gas Chemical Co., Inc., number-average molecular weight Mn 20320, weight-average molecular weight Mw 30320), 2.28 g of bisphenol A and 0.22 g of zinc acetate as a catalyst were suspended in 200 ml of 1,2,4-trichlorobenzene, and the mixture was heated with stirring at 180° C. for 3 hours. After cooling, the resulting mixture was charged into much excess of methanol and separated by sedimentation to obtain the diol of the polycarbonate. The yield (ratio) was 86%, Mn was 2170, and Mw was 2730 by GPC.

Then, 17.2 g of the polycarbonate diol synthesized and 1.60 g of triethylamine were dissolved in 50 ml of chloroform, and to this solution was added a solution obtained by dissolving 2.5 g of 4,4'-azobis(4-cyanopentanoic acid chloride) in 50 ml of chloroform dropwise with ice-cooling. Then the resulting mixture was heated at 35° C. for 1 hour, subsequently was recovered in much excess of methanol to obtain a PC-containing polyazo compound. The yield (ratio) was 96%, Mn was 21700, Mw was 52000, and the repeating unit number was 9.0.

(2) Copolymer of PC-ultraviolet ray absorbing compound

Then, 1.0 g of the PC-containing polyazo compound synthesized in the above-mentioned (1) and 3.26 g of a benzophenone-type ultraviolet ray absorbing compound having a terminal vinyl group ("ADK STAB LA-22" manufactured by Asahi Denka Kogyo K. K.) were dissolved in 20 ml of chloroform, and the resulting mixture was heated at 80° C. for 6 hours, cooled, subsequently was charged into much excess of methanol, and the sedimented material was recovered by filtration. The yield (ratio) was 87%, Mn was 60000, Mw was 123400, and as a result of $^1$H-NMR measurement, the ratio by % by weight of the PC segment in the block copolymer to the polybenzophenone segment in the ultraviolet absorbing compound was 26% to 74%, and the azo group was completely consumed.

EXAMPLE 3

(1) Copolymer of PC-ultraviolet ray absorbing compound having remaining azo group In this process, 5.0 g of the PC-containing polyazo compound synthesized in the above-mentioned (1) of Example 2 and 8.16 g a benzophenone-type ultraviolet ray absorbing compound having a terminal vinyl group ("ADK STAB LA-22" manufactured by Asahi Denka Kogyo K. K.) were dissolved in 100 ml of chloroform, and the resulting mixture was heated at 80° C. for 1 hour, cooled, subsequently was charged into much excess of methanol, and the sedimented material was recovered. The yield (ratio) was 50%, Mn was 67800, Mw was 101300, and as a result of $^1$H-NMR measurement, the ratio by % by weight of the PC segment in the block copolymer to the polybenzophenone segment in the ultraviolet absorbing compound was 64% to 36%.

(2) Copolymer of PC-ultraviolet ray absorbing compound-lower cohesive energy segment Since the azo group was contained in the copolymer of the PC-ultraviolet ray absorbing compound obtained in the above-mentioned (1), 2.0 g of this copolymer and 2.0 g of a silicone having a vinyl group ("X-22-174DX" manufactured by Shinetsu Silicone K. K.) were dissolved in 50 ml for chloroform, the mixture was reacted at 80° C. for a long time of 6 hours to polymerize and the azo group was completely consumed and decomposed, cooled, then charged into much excess of methanol. The sedimented material was recovered. The yield (ratio) was 56%, Mn was 41300, Mw was 71500 and as a result of $^1$H-NMR measurement, the ratio by % by weight of the PC segment in the block copolymer to the polybenzophenone segment in the ultraviolet absorbing compound to the silicone segment was 32% to 58% to 10%.

Comparative Example 1

(1) Synthesis of homopolymer of ultraviolet ray absorbing compound

In this process, 1.63 g of a benzophenone-type ultraviolet ray absorbing compound LA-22 having a terminal vinyl group and 0.0164 g of azobisisobutyronitrile were dissolved in 5 ml of toluene, and the mixture was heated at 80° C. for 6 hours. After cooling, the mixture was charged into much excess of methanol, then the sedimented material was recovered by filtration. The yield (ratio) was 81%, Mn was 17100 and Mw was 61300.

(Ultraviolet Ray Absorbing Test)

The copolymers of Examples 2 and 3 and the polymer of the Comparative Example 1 were respectively added to a polycarbonate ("Yupiron S-3000" manufactured by Mitsubishi Gas Chemical Co., Inc.), and films were made by a casting method. The amount added of the ultraviolet ray absorbing compound was unified to 0.01%, and the thickness of the film was about 100 μm.

Further, there were prepared a polycarbonate film formed by adding 0.01% of 1,4-dihydroxybenzophenone as ultraviolet ray absorbing compound monomer as Comparative Example 2, and a polycarbonate film to which no ultraviolet ray absorbing compound was added as Comparative Example 3, in the same manner as described above.

As a weatherability test regarding these films, ultraviolet ray exposing test was conducted for 1200 hours according to JIS A1415, then yellowing factor of those samples was judged by naked eyes, and the results are summarized in Table 6.

TABLE 6

| Sample | Ultraviolet ray absorbing agent form | Judge |
| --- | --- | --- |
| Example 2 | PC-P (UVA) | ○ |
| Example 3 | PC-P (UVA)-P(Si) | ◎ |
| Comparative Example 1 | P (UVA) | Δ |
| Comparative Example 2 | UVA | Δ |
| Comparative Example 3 | — | × |

From Table 6, it is known that the block copolymer containing the silicone of Example 3 has no yellow change and is most excellent, the block copolymer of Example 2 is excellent second to that of Example 3; however, the polymers of the Comparative Examples 1, 2 and 3 manifest yellow changing.

EXAMPLE 4

(1) Synthesis of polyolefin-containing polyazo compound

To use a polyolefin as the segment to be introduced in a polyazo compound, 4.24 g of a low molecular weight polyolefin diol (Polyether HA manufactured by Mitsubishi Chemical Co., Ltd.) and 0.40 g of triethylamine were dissolved in 50 ml of chloroform, and to the solution was added a solution obtained by dissolving 0.63 g of azobis-cyanopentanoic acid chloride into 50 ml of chloroform dropwise with ice-cooling. The resulting mixture was heated at 35° C. for 1 hour, then recovered in much excess of methanol, to obtain a polyazo compound containing a polyolefin. The yield (ratio) was 90%, Mn was 12100, Mw was 16700 and the repeating unit number was 5.2.

EXAMPLE 5

(1) Synthesis of polyolefin-phosphorus containing block copolymer

In this example, 2.04 g of the polyolefin-containing polyazo compound synthesized in the above-mentioned (1), 2.05 g of diphenyl-2-methaccoyloxyphosphate ("MR-260" manufactured by Daihachi Kagaku Kogyo K. K.) as a phosphorus compound were dissolved in 10 ml of chloroform, and the solution was heated at 80° C. for a long time of 6 hours, cooled, then charged into much excess of methanol. The sedimented material was recovered, subjected to vacuum drying, to obtain a transparent adhesive solid. The polymerization ratio was 25%, Mn was 53500, Mw was 100400 and as a result of $^1$H-NMR measurement, the ratio by % by weight of the polyolefin diol in the block copolymer to the phosphorus compound was 53% to 47%.

EXAMPLE 6

Further, the copolymer PC-P (UVA) of the example regarding Example 2 and "benzophenone-type ultraviolet ray absorbing compound ("ADK; STB LA-22" manufactured by Asahi Denka Kogyo K. K.)" were added to the polycarbonate ("Yupiron E-2000F" manufactured by Mitsubishi Gas Chemical Co., Inc.) to prepare a solution which was subsequently coated onto a releasing polyethylene terephthalate film ("A-11" manufactured by Teijin Ltd.). The thickness was from 40 to 50 μm, and the amount added of the ultraviolet ray absorbing compound was unified to 5%. These coating film were respectively press-transferred onto polycarbonate plates ("PC-1600" manufactured by Takiron K. K.) to obtain polycarbonate plates having a ultraviolet absorbing layer formed on the surface layer (Example 6 and Comparative Example 4, respectively). And, polycarbonate plates containing no ultraviolet ray absorbing agent were prepared (Comparative Example 5).

The test pieces were subjected to accelerated exposing test for 240 hours and 480 hours corresponding respectively to 5 years and 10 years of exposure outside using a weatherability testing machine (Metal weather KU-R3 type manufactured by Daiplawintes K. K.), and yellow changing of the samples after exposure was examined. The results are summarized in Table 7. The yellowing factor was measured according to JIS K7103 using a Shimadzu self recording spectrophotometer (UV-3100OPC)-installed camera measuring software manufactured by Shimadzu corp. With the surface exposed orienting to the light source.

TABLE 7

| Sample | Ultraviolet absorbing agent form | Yellowing factor | |
|---|---|---|---|
| | | 240H | 480H |
| Example 6 | PC-P (UVA) | 7.68 | 13.57 |
| Comparative Example 4 | UVA | 14.09 | 18.31 |
| Comparative Example 5 | — | 20.38 | 28.44 |

Figure 5:
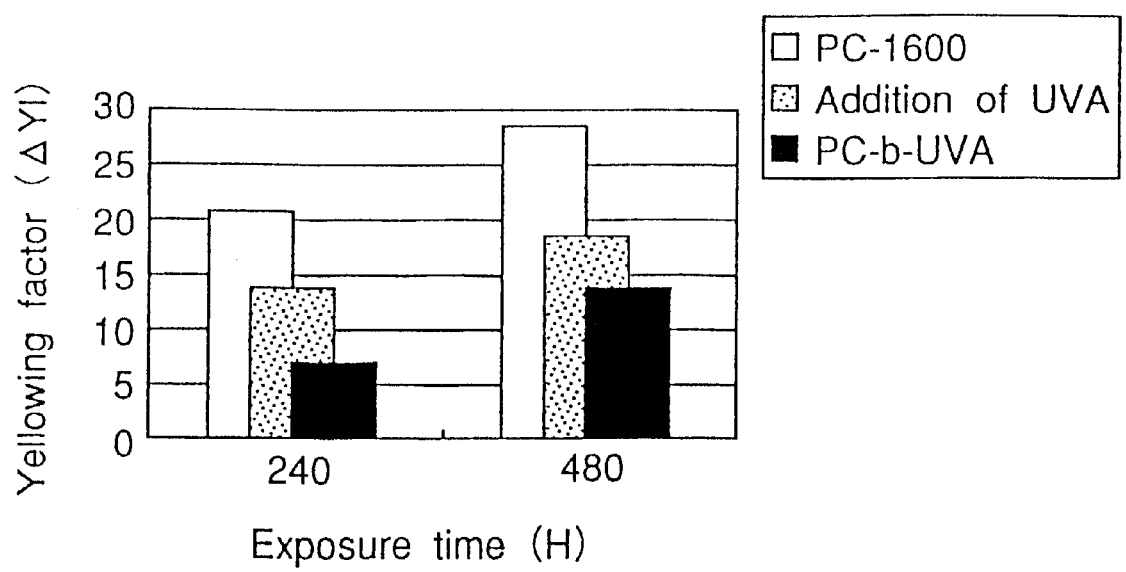
FIG. 5 is a graph showing the weatherability of a polycarbonate plate to which the copolymer-based ultraviolet ray protecting agent of the present invention is blended.

It is known from Table 7 and FIG. 5 that the polycarbonate plate containing the block copolymer of the ultraviolet ray absorbing material of the example has more excellent resistance against ultraviolet ray as compared with the polycarbonate plate to containing no ultraviolet ray absorbing material added of Comparative Example 5, and further, when compared with a polycarbonate plate to which only conventional ultraviolet ray absorbing material is added, the yellowing factor is about ½.

The compatibilizing agent of the present invention can be used to improve the compatibility between a condensation-type polymer and a vinyl-based polymer, and consequently is effective in micronization of the micro structure of the blend resin having poor compatibility and is expected to improve mechanical strength of the resulting resin, since the agent of the present invention is a block copolymer comprising the condensation-type segment and the vinyl-based segment.

In the production method of the compatibilizing agent of the present invention, if the combination of blending polymers is determined, a block copolymer is easily determined comprising respectively corresponding condensation-type segment and vinyl-based segment, and further, the condensation-type segment to be introduced into the compatibilizing agent can be synthesized easily from starting materials condensation-type polymer and divalent alcohol, therefore, a block copolymer nay be easily formed.

The functional block copolymer of the present invention can be used as a condensation-type polymer to which functions are imparted such as ultraviolet ray absorbing property, flame retardancy, impact resistance and the like, since the functional block copolymer is a functional block copolymer of a condensation-type polymer segment and a vinyl-based polymer segment for imparting functions. Further, this functional block copolymer can be used as an additive to a resin in which a condensation-type polymer segment manifests compatibility, and can impart ultraviolet ray absorbing property, flame retardancy and impact resistance to a resin stably and uniformly by selecting the vinyl-based segment for imparting functions.

Further, by forming a functional block copolymer comprising a lower cohesive energy segment together with the condensation-type polymer segment and the vinyl-based polymer segment for imparting functions, the functional segment can be particularly condensed on the surface of the resin to which this copolymer is added to effectively impart ultraviolet ray absorbing property, pollution resistance and the like to the surface of the resulting resin.

In the functional block copolymer of the present invention, the compatibility against the resin to be added can be controlled by combining the condensation-type polymer segment and the other vinyl-based segment, and also regarding a polyolefin-based resin or the like in addition to the condensation-type resin, the vinyl-based polymer segment for imparting functions is easily dispersed in the resin uniformly, and functions such as ultraviolet ray absorbing property, flame retardancy, impact resistance and the like are easily imparted to the resin.

In the production method of the functional block copolymer of the present invention, the combination of the condensation-type polymer and the vinyl-based segment can be selected at will to produce a block copolymer having desired functions, since a polyazocompound and polymeric peroxide compound are used as a polymerization initiator.

What is claimed is:

1. A functional block copolymer comprising an azo groups-containing condensation or vinyl polymer segment, a vinyl polymer segment for imparting functions and a lower cohesive energy polymer segment in a repeating unit.

2. A production method of a functional block copolymer, comprising block-polymerizing a radical polymerizing function imparting monomer and a lower cohesive energy polymer having a vinyl group on the end in turn to an azo groups-containing condensation or vinyl polymer segment having an azo group in a repeating unit and using said azo group as a radical polymerization initiator.

3. The production method of a functional block copolymer according to claim 2, wherein the lower cohesive energy polymer is a polyorganosiloxane or polyfluoroalkyl polymer.

4. The functional block copolymer according to claim 1, wherein said vinyl polymer segment for imparting functions is a ultraviolet absorbing copolymer which is a polymer of a vinyl group-containing benzophenone derivative or vinyl group-containing benzotriazol derivative.

5. The production method of a functional block copolymer according to claim 2, wherein the function imparting monomer is an ultraviolet absorbing monomer having a reactive vinyl group.

6. The production method of a functional block copolymer according to 5, wherein the ultraviolet absorbing monomer is a vinyl group-containing benzophenone derivative or a vinyl group-containing benzotriazole derivative.

7. The production method of a functional block copolymer according to claim 2, wherein a peroxide groups-containing condensation or vinyl polymer segment is used instead of said azo groups-containing condensation or vinyl polymer, said peroxide group is used as a polymerization initiator instead of said azo group.

8. The production method of a functional block copolymer according to claim 3, wherein a peroxide groups-containing condensation or vinyl polymer segment group is used instead of said azo groups-containing condensation or vinyl polymer, said peroxide group is used as a polymerization initiator instead of said azo group.

* * * * *